3,144,459
D - 3 - METHOXY-4-PHENOXY-N-METHYL-Δ⁶-MORPHINAN, DERIVATIVES THEREOF, AND METHOD FOR THE PURIFICATION THEREOF
Yoshiro Sawa, Ashiya-shi, Shin Maeda, Amagasaki-shi, and Naoki Tsuji, Semboku-gun, Japan, assignors to Shionogi & Co., Ltd., Osaka, Japan
No Drawing. Original application Aug. 6, 1962, Ser. No. 214,855. Divided and this application Jan. 29, 1963, Ser. No. 258,945
Claims priority, application Japan Dec. 29, 1959
10 Claims. (Cl. 260—285)

This invention relates to new morphinan derivatives, D-3-methoxy-N-methyl-Δ⁶-morphinan and its salts. More particularly, this invention relates to D-3-methoxy-N-methyl-Δ⁶-morphinan, its quaternary salts and its non-toxic acid addition salts, which are useful therapeutica having remarkable activities on the nervous system. In other aspects, this invention relates to related morphinan derivatives useful in the preparation of D-3-methoxy-N-methyl-Δ⁶-morphinan as well as to a method for the purification of the latter. It also relates to the use of the said compound for therapeutic purposes.

This application is a division of application Serial No. 214,855, filed August 6, 1962,, which is a continuation-in-part application of our co-pending application Serial No. 76,511, filed on December 19, 1960, now U.S. Patent No. 3,085,091.

It is well known that compounds of the morphinan series have powerful analgesic or antitussive actions and that most compounds of the series have strong habit-forming attributes. On the contrary, the compound of the present invention shows very different pharmacological activities, e.g. potentiated narcosis, anti-extensor effect and suppression of aggressive behavior. Moreover, it has no analgesic and no antitussive activities, and no habit-forming attributes. No compound of the morphinan series having such properties has hitherto been known. Recently, it was reported by M. Gates et al. (J. Am. Chem. Soc., 80, 1186–1194) that 3-hydroxy-N-methyl-Δ⁶-isomorphinan showed a strong analgesic activity, although it is a most similar compound to the known morphinan derivatives. Therefore, the compound of the present invention is a novel and very unique morphinan derivative having an enormous and broad usefulness as a therapeutic.

The compound of the present invention, D-3-methoxy-N-methyl-Δ⁶-morphinan, can be prepared through various routes. Some of these may be represented by the following schemes:

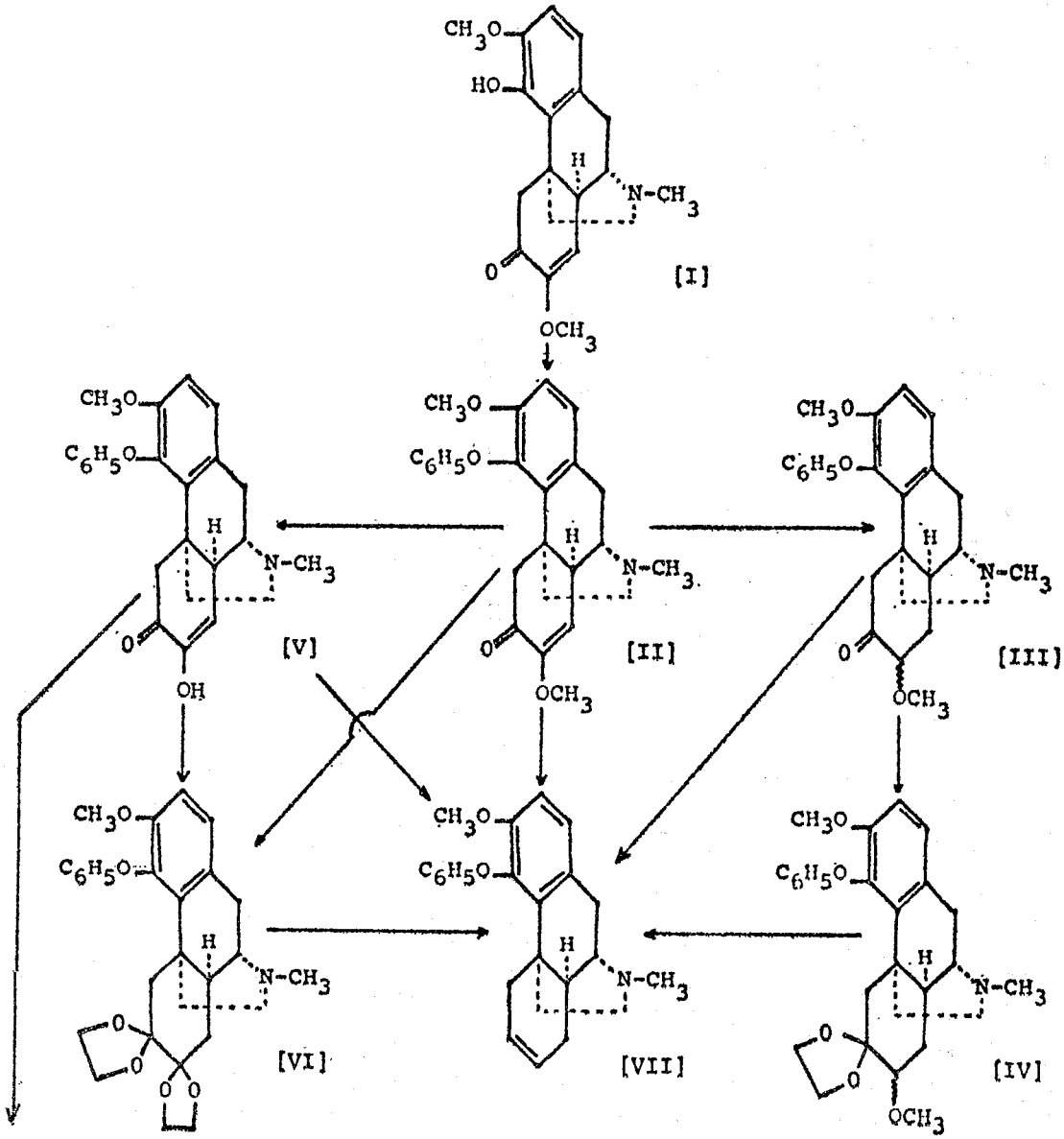

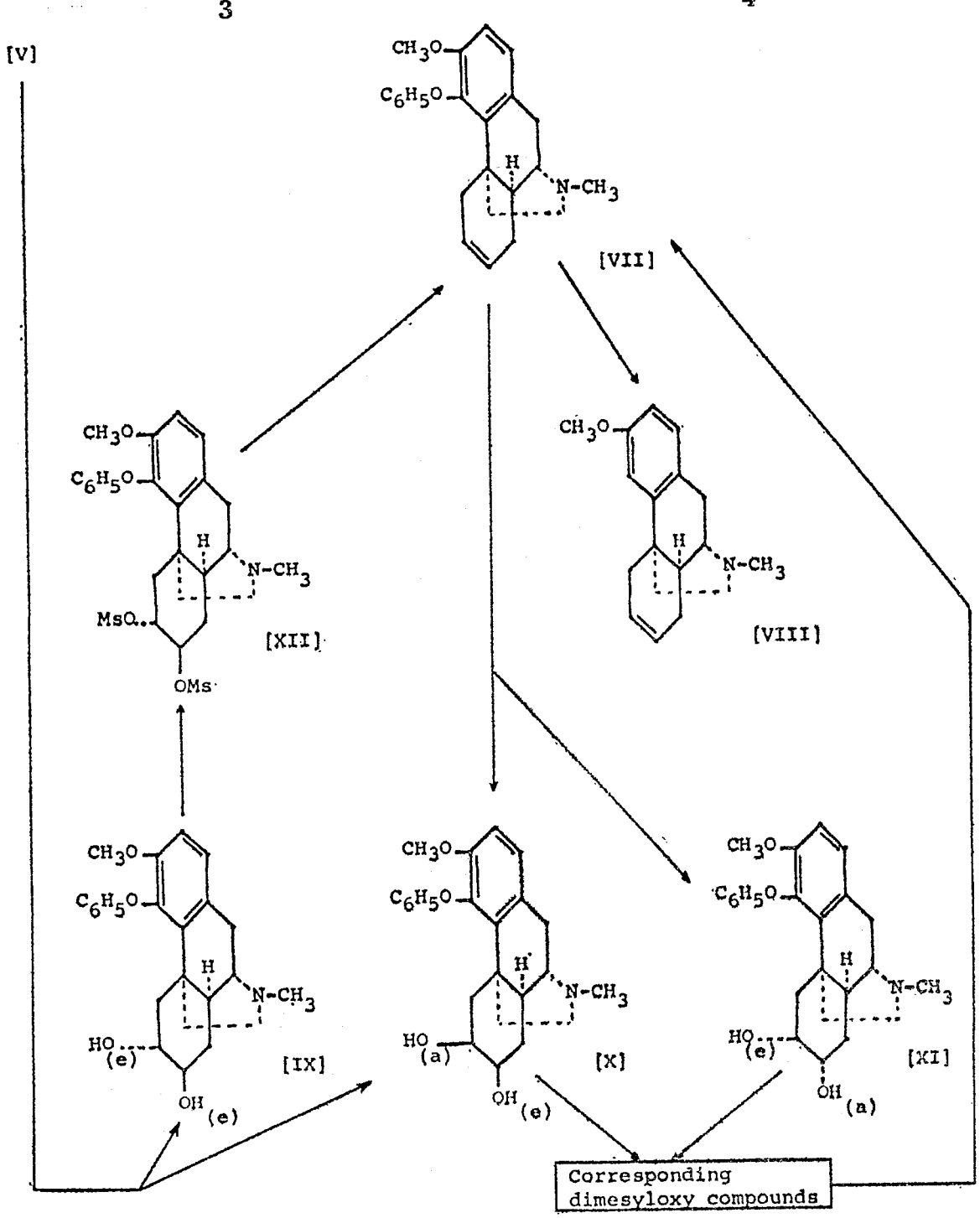

The starting material of this invention is sinomenine, one of alkaloids obtained from a plant *Sinomenium acutum*. In this specification the morphinan nucleus of sinomenine is presented as "D"-morphinan and all the compounds are named on this basis.

Firstly, D-3,7-dimethoxy-4-hydroxy-6-oxo-N-methyl-$\Delta^7$-morphinan [I], sinomenine, is treated with halogenobenzene in a basic solvent in the presence of copper powder as catalyst to produce D-3,7-dimethoxy-4-phenoxy-6-oxo-N-methyl-$\Delta^7$-morphinan [II]. The compound [II] may be treated with amalgamated zinc in concentrated hydrochloric acid to give D-3-methoxy-4-phenoxy-N-methyl-$\Delta^6$-morphinan [VII]. Alternatively, the compound [II] may be converted to D-3,7-dimethoxy-4-phenoxy-6-oxo-N-methylmorphinan [III] by catalytic reduction and the latter may be ketalized to D-3,7-dimethoxy-4-phenoxy-6,6-ethylenedioxy - N - methylmorphinan [IV]. On the other hand, the compound [II] may be hydrolyzed to D-3-methoxy-4-phenoxy-6-oxo-7-hydroxy - N - methyl-$\Delta^7$-morphinan [V] which is a tautomer of D-3-methoxy-4-phenoxy-6,7-dioxo-N-methylmorphinan, and the compound [II] as well as the compound [V] may be ketalized to D-3-methoxy - 4 - phenoxy-6,6;7,7-bisethylenedioxy-N-methyl-morphinan [VI].

Compounds [III], [IV], [V], and [VI] may be also treated with amalgamated zinc in concentrated hydrochloric acid to yield compound [VII].

Compound [VII] is treated with alkali-metal or alkaline-earth-metal in liquid ammonia to yield the objective compound [VIII], D-3-methoxy-N-methyl-$\Delta^6$-morphinan, of which chemical structure has been determined as follows:

(1) The catalytic reduction of compound [VIII] with one molecular equivalent of hydrogen results in D-3-methoxy-N-methylmorphinan, M.P. 109–111° C. which is identical with an authentic sample prepared by a method of O. Schnider et al. (Helv. Chim. Acta, 34, 2211; ibid., 37, 710).

(2) The oxidation of compound [VII] with osmium tetroxide produces corresponding dihydroxy-compounds [X], M.P. 115–126° C. and [XI], M.P. 175–177° C., and the former compound [X] is identical with a compound obtained by reduction of compound [V] with sodium boron hydride.

(3) The compound [VII] can be obtained by de-mesyloxylation of compound [XII] (the methiodide: M.P. 228° C. (decomp.)) which is prepared by mesylation of the compound [IX], M.P. 126–136° C., one of the reduction products of compound [V] with sodium boron hydride. All the dihydroxy compounds, e.g. [X] and [XI] can be also converted to compound [VII] by the same method.

Although thus produced compound [VIII] can be used as such, it is usually contaminated by a small quantity of by-products having closely similar structures. To obtain an absolutely purified compound [VIII], it is advantageous to carry out a purification at the step of compound [VII]. For this purpose, the crude compound [VII] may be converted to the corresponding N-oxide of the 6,7-epoxide by oxidation with per-acid and subsequently hydrogenated by catalytic reduction to give the 6,7-epoxide [XIV], which can be easily purified by recrystallization as a benzoate. Then, the epoxide [XIV] may be treated with hydrogen bromide to yield the corresponding bromohydrine [XV] and the latter may be treated with metallic zinc in acetic acid to regenerate the compound [VII].

This purification may be illustrated by the following formulae:

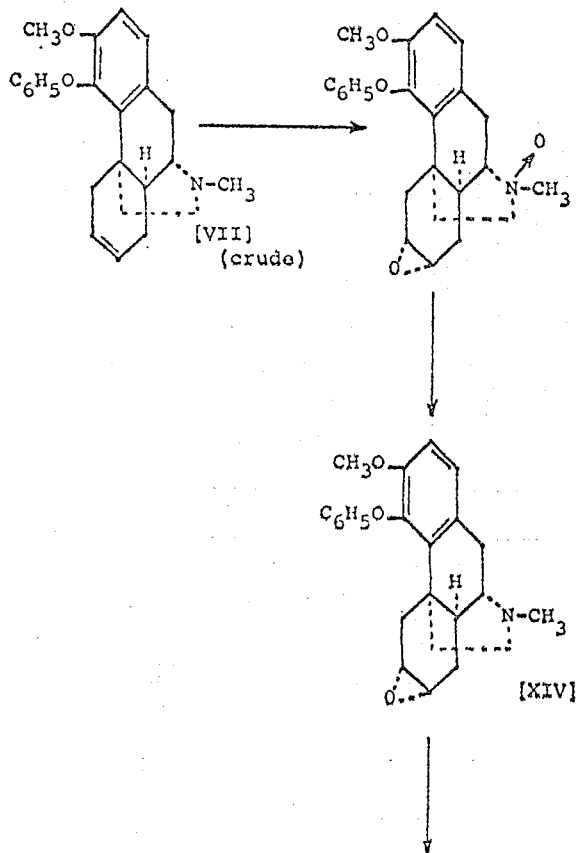

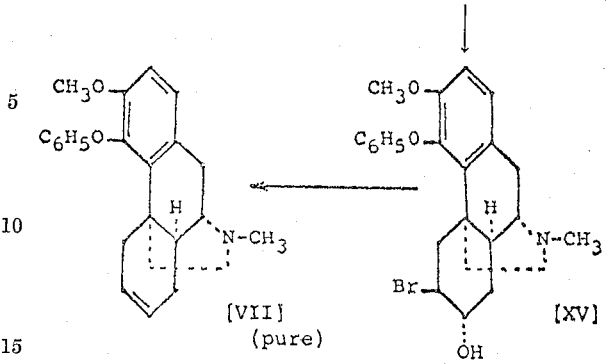

When thus purified compound [VII] is treated with alkali-metal or alkaline-earth-metal in liquid ammonia as described beforehand, the compound [VIII] can be obtained in an absolutely pure state.

The compound [VIII] is usually used as hydrohalide such as hydrochloride, hydrobromide or hydroiodide, but it may be used as quaternary salt with a lower alkyl halide containing up to five carbon atoms (e.g. methyl bromide, ethyl chloride, butyl bromide, etc.) or as a non-toxic acid addition salt such as sulfate, phosphate or the like.

Thus produced D-3-methoxy-N-methyl-$\Delta^6$-morphinan [VIII] is a novel compound having a distinguished therapeutic usefulness.

The pharmacological properties of the compound are advantageously tested as hydrobromide-hydrate.

Its acute toxicity in mice is presented in Table I.

TABLE I

| | $LD_{50}$ (mg./kg.) |
|---|---|
| Intravenous injection | 68.8 |
| Subcutaneous injection | 147.4 |
| Oral administration | 190.1 |

No analgesic activity is observed by the Haffner-Hesse method (Arch. exp. Path. u. Pharm., 158, 233) in mice, or by the D'Amour-Smith method (J. Pharmacol, 72, 74; ibid., 77, 184) in rats.

Potentiated narcosis of this compound with Thiopental Sodium is 1.5 times as strong as that of morphine.

Although morphine shows no anti-extensor effect, this compound has a remarkable anti-electroshock-convulsant effect in mice as shown in Table II.

TABLE II

| Compounds | Time required for appearance of maximum effect (seconds) | $ED_{50}$ (mg./kg.) |
|---|---|---|
| This compound [1] | 20 | 8.7 |
| Methyl Hexabital Sodium | 5 | 40.7 |
| Diphenyl Hydantoin | 120 | 30.1 |

[1] D-3-methoxy-N-methyl-$\Delta^6$-morphinan (as hydrobromide-hydrate).

This compound shows a strong suppression of fighting behavior in hamsters. 25 mg./kg. (s.c.) of this compound are as intensive as 75 mg./kg. (s.c.) of chloropromazine in hamsters. Moreover, 1–2 mg./kg. (s.c.) remarkably suppress aggressive behaviors of monkeys.

These remarkable properties show that the compound [VIII] is an effective central nervous depressant, particularly is a very unique sedative agent.

No habit-forming attribute of or physical dependence on this compound is observed in rats and monkeys.

The compound [VIII] is useful as an anticonvulsant for treatment of epilepsy or the like and as a tranquilizer for treatment of mental disorders, especially for suppression of aggressive behavior.

The tranquilizing effect of this compound [VIII] is much distinguished in its property of causing no sleepiness, which is a generally unavoidable incident of a usual tranquilizer.

Practical and presently preferred embodiments of this invention are illustrated by the following examples. The abbreviation "g." refers to grams, and "cc." to milliliters.

*Example 1*

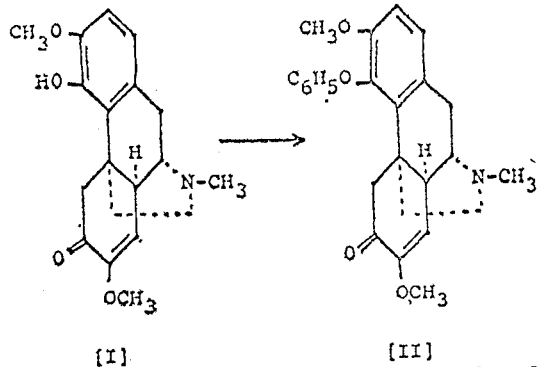

A mixture of D-3,7-dimethoxy-4-hydroxy-6-oxo-N-methyl-Δ⁷-morphinan [I] (16.5 g.), bromobenzene (15.7 g.), potassium carbonate (10.3 g.), copper powder (0.5 g.) and pyridine (50 cc.) is refluxed for 15 hours. The hot reaction mixture is filtered and washed with hot pyridine. The solvent is removed by distillation and the residue is dissolved in benzene. The benzene solution is filtered, washed with water, dried on potassium carbonate and chromatographed on alumina to yield 22 g. of crude product. Recrystallization from benzene gives 20.7 g. of the pure benzene adduct of D-3,7-dimethoxy-4-phenoxy-6-oxo-N-methyl-Δ⁷-morphinan [II], M.P. 122–124° C.

$[\alpha]_D^{19}$ —111.9° (0.940% in ethanol).

*Analysis.*—Calcd. for $C_{25}H_{27}O_4N \cdot C_6H_6$: C, 76.99; H, 6.88; N, 2.90. Found: C, 76.92; H, 7.09; N, 2.76.

The pyridine adduct is separated on cooling the reaction mixture and crystallizing from pyridine, M.P. 120–123° C.

$[\alpha]_D^{19}$ —116.4° (0.975% in ethanol).

*Analysis.*—Calcd. for $C_{25}H_{27}O_4N \cdot C_5H_5N$: C, 74.35; H, 6.66; N, 5.78. Found: C, 74.51; H, 6.67; N, 5.78.

The free base is crystallized from ether, M.P. 142–143° C.

$[\alpha]_D^{18}$ —137.8° (0.994% in ethanol).

*Analysis.*—Calcd. for $C_{25}H_{27}O_4N$: C, 74.05; H, 6.75; N, 3.45. Found: C, 73.94; H, 7.07; N, 3.27.

The picrate is prepared in ether and crystallizes from ethanol, M.P. 230–231° C.

*Analysis.*—Calcd. for $C_{25}H_{27}O_4N \cdot C_6H_3O_7N_3$: C, 58.67; H, 4.77; N, 8.83. Found: C, 58.95; H. 4.93; N, 8.83.

The methiodide is prepared in and crystallizes from ethanol, M.P. 206° C. (decomp.).

$[\alpha]_D^{19}$ —121.5° (0.969% in ethanol).

*Analysis.*—Calcd. for $C_{25}H_{27}O_4N \cdot CH_3I \cdot C_2H_5OH$: C, 56.66; H, 6.11; N, 2.36; I, 21.39. Found: C, 56.46; H, 6.04; N, 2.42; I, 21.31.

*Example 2*

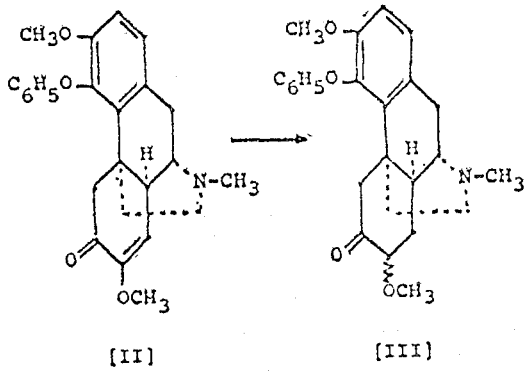

A solution of the benzene adduct of D-3,7-dimethoxy-4-phenoxy-6-oxo-N-methyl-Δ⁷-morphinan [II] (12 g.) in ethanol (100 cc.) is hydrogenated over Adams' catalyst (100 mg.) at room temperature (20 to 30° C.). After absorption of 700 cc. of hydrogen, the solution is filtered and evaporated to dryness. The residue in a small amount of ethanol is treated with an ethanolic solution of picric acid. The yield of yellow crystalline picrate of D-3,7-dimethoxy-4-phenoxy-6-oxo-N-methylmorphinan [III] is almost quantitative, M.P. 208° C. (decomp.).

*Analysis.*—Calcd. for $C_{25}H_{29}O_4N \cdot C_6H_3O_7N_3$: C, 58.84; H, 5.07; N, 8.80. Found: C, 58.02; H, 5.27; N, 8.32.

A sample of the picrate is converted to the free base by partition between ether and diluted sodium hydroxide solution. The ether extracts are washed with diluted sodium hydroxide solution and water, dried, filtered and chromatographed on alumina, yielding a colorless oil which crystallizes on standing. Crystallization from ether gives pure D-3,7-dimethoxy-4-phenoxy-6-oxo-N-methylmorphinan [III], M.P. 149–154° C.

$[\alpha]_D^{24}$ —5.9° (0.904% in ethanol).

*Analysis.*—Calcd. for $C_{25}H_{29}O_4N$: C, 73.68; H, 7.17; N, 3.44. Found: C, 73.84; H, 7.25; N, 3.41.

The methiodide is crystallized from ethanol, M.P. 255° C. (decomp.).

*Analysis.*—Calcd. for $C_{25}H_{29}O_4N \cdot CH_3I$: C, 56.83; H, 5.87; N, 2.55; I, 23.10. Found: C, 56.57; H, 5.82; N, 2.44; I, 23.21.

*Example 3*

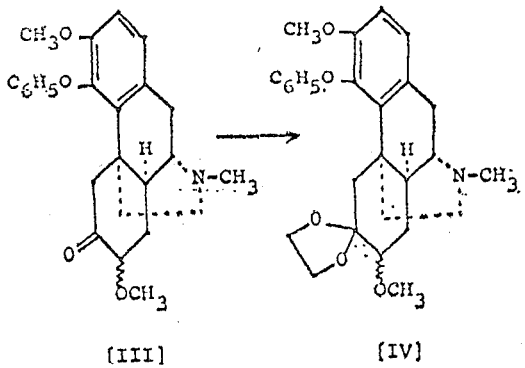

A benzene solution of D-3,7-dimethoxy-4-phenoxy-6-oxo-N-methylmorphinan [III] (2.6 g.) and ethylene glycol (5 cc.) is refluxed with toluene-p-sulfonic acid (2 g.) for 7 hours, and yields 2.9 g. of D-3,7-dimethoxy-4-phenoxy-6,6-ethylenedioxy-N-methylmorphinan [IV] as a sirup (essentially quantitative).

$[\alpha]_D^{17}$ —56.2° (1.0% in ethanol).

The methiodide is prepared in and crystallizes from ethanol, M.P. 260° C. (decomp.).

$[\alpha]_D^{25}$ —46.2° (1.165% in ethanol).

*Analysis.*—Calcd. for $C_{27}H_{33}O_5N \cdot CH_3I$: C, 56.66; H, 6.11; N, 2.36; I, 21.39. Found: C, 56.65; H, 6.13; N, 2.29; I, 21.75.

*Example 4*

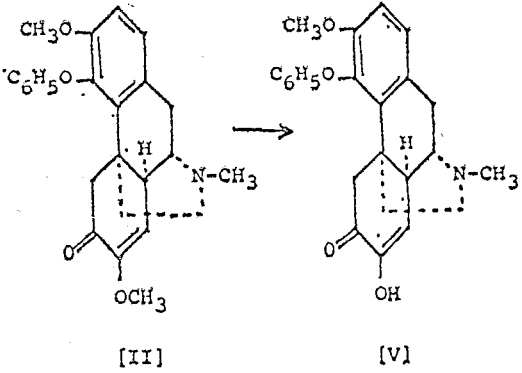

A solution of the benzene adduct of D-3,7-dimethoxy-4-phenoxy-6-oxo-N-methyl-Δ⁷-morphinan [II] (12 g.) in 10% hydrochloric acid (120 cc.) is heated for 2 hours on a water bath. Upon cooling, the solution is made basic with 20% aqueous sodium carbonate solution and the crystalline product is washed with water and crystallized from methanol yielding 8.45 g. of pure D-3-methoxy - 4-phenoxy-6-oxo-7-hydroxy-N-methyl-Δ⁷-morphinan [V], M.P. 212–214° C.

[α]$_D^{22}$ —64.7° (1.043% in chloroform).

Analysis.—Calcd. for $C_{24}H_{25}O_4N·½CH_3OH$: C, 72.21; H, 6.68; N, 3.44; $OCH_3$, 11.42. Found: C, 72.37; H, 6.61; N, 3.35; $OCH_3$, 10.80.

*Example 5*

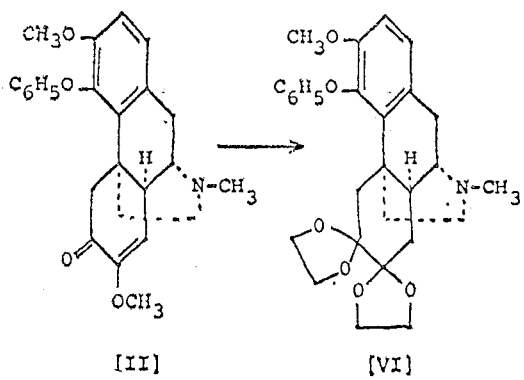

[II]                [VI]

A benzene solution of the benzene adduct of D-3,7-dimethoxy-4-phenoxy-6-oxo-N-methyl-Δ⁷-morphinan [II] (4 g.) and ethyleneglycol (10 cc.) is refluxed with toluene-p-sulfonic acid (3.5 g.) for 7 hours with an azeotropic receiver to collect the volatile products. Upon cooling, 10% sodium carbonate solution is added to give a slightly alkaline reaction and the two layers are separated. The alkaline solution is extracted with chloroform and the crude base is chromatographed on alumina, the chloroform eluate yielding 3 g. of D-3-methoxy-4-phenoxy - 6,6;7,7-bisethylene-dioxy-N-methylmorphinan [VI]. Crystallization from ethylacetate yields 2.6 g. of the pure product, M.P. 198–200° C.

[α]$_D^{23}$ —37.6° (1.037% in ethanol).

Analysis.—Calcd. for $C_{28}H_{33}O_6N$: C, 70.12; H, 6.94; N, 2.92. Found: C, 70.32; H, 6.94; N, 2.96.

The methiodide is prepared in and crystallizes from ethanol, M.P. 120° C.

[α]$_D^{21}$ —21.0° (1.093% in methanol).

Analysis.—Calcd. for $C_{28}H_{33}O_6N·CH_3I$: C, 54.46; H, 5.99; N, 2.19; I, 19.85. Found: C, 54.81; H, 6.18; N, 2.00; I, 19.69.

*Example 6*

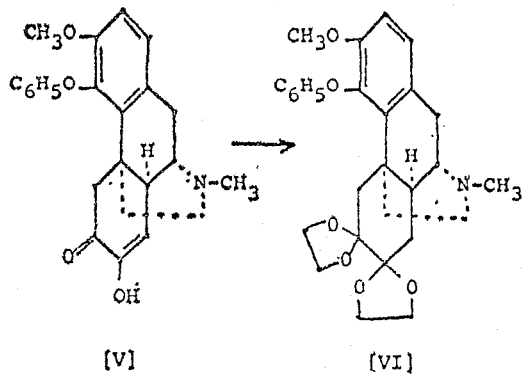

[V]                [VI]

A benzene solution of D-3-methoxy-4-phenoxy-6-oxo-7-hydroxy-N-methyl-Δ⁷-morphinan [V] (5 g.) and ethylene glycol (10 cc.) is refluxed with toluene-p-sulfonic acid (4 g.) for 7 hours as described in the Example 5. The reaction mixture yields 4.76 g. of D-3-methoxy-4-phenoxy - 6,6;7,7-bisethylenedioxy-N-methylmorphinan [VI], M.P. 198–200° C. and this is not depressed on admixture with the sample obtained in the Example 5.

*Example 7*

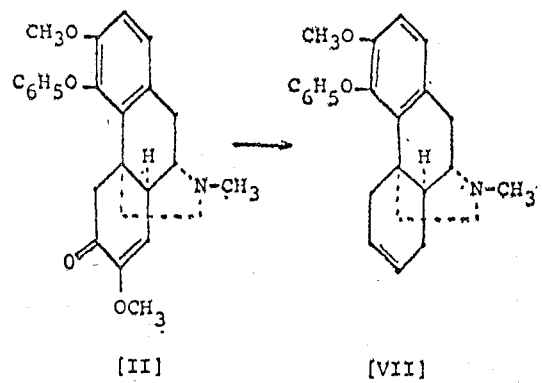

[II]                [VII]

Amalgamated zinc (prepared from 20 g. of mossy zinc and 2 g. of mercuric chloride) is added in small portions to a hot solution of the benzene adduct of D - 3,7 - dimethoxy - 4 - phenoxy - 6 - oxo - N - methyl-Δ⁷-morphinan [II] (3.6 g.) in concentrated hydrochloric acid (25 cc.) during 2 hours. The mixture is heated on a water bath with stirring for 6 hours, during which time concentrated hydrochloric acid (15 cc.) is added every 2 hours. The solution is cooled to room temperature, diluted with water, made basic with diluted sodium hydroxide solution and extracted with benzene. The solvent is distilled off under reduced pressure and 2.7 g. of crude product is obtained. An ethanolic solution of the product is refluxed with hydroxylamine hydrochloride (0.5 g.) and sodium acetate (0.5 g.) for one hour. The solvent is distilled off and the residue in water made alkaline with diluted sodium hydroxide solution and extracted with ether. The product is chromatographed on alumina and the ether eluate gives 2.43 g. of D-3-methoxy-4-phenoxy-N-methyl-Δ⁶-morphinan [VII] as a sirup.

[α]$_{23}$+52.4° (0.722% in ethanol).

The free base does not crystallize, but its methanol adduct is obtained as needles when this sirup is treated with methanol, M.P. 91–96° C.

[α]$_D^{22}$+51.5° (1.028% in ethanol).

Analysis.—Calcd. for $C_{24}H_{27}O_2N·CH_3OH$: C, 76.30; H, 7.94; N, 3.56; $OCH_3$, 15.77. Found: C, 76.47; H, 8.02; N, 3.51; $OCH_3$, 14.55.

The methiodide is prepared in and crystallizes from ethanol, M.P. 228° C.

[α]$_D^{24}$+34.4° (1.016% in ethanol).

Analysis.—Calcd. for $C_{24}H_{27}O_2N·CH_3I·C_2H_5OH$: C, 59.01; H, 6.60; N, 2.55; I, 23.10. Found: C, 58.63; H, 6.67; N, 2.82; I, 23.43.

The picrate is prepared in and crystallizes from ethanol, M.P. 211–212° C.

Analysis.—Calcd. for $C_{24}H_{27}O_2N·C_6H_3O_7N_3$: C, 61.01; H, 5.12; N, 9.49. Found: C, 60.88; H, 5.44; N, 9.29.

*Example 8*

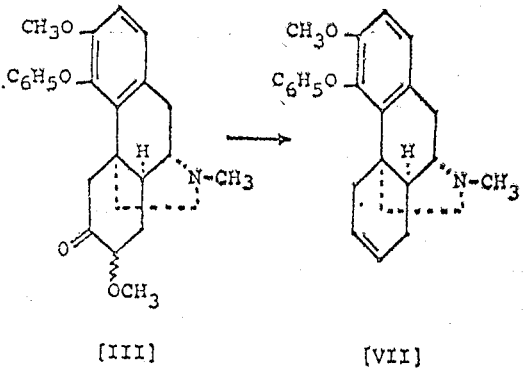

[III]                [VII]

D - 3,7 - dimethoxy - 4 - phenoxy - 6 - oxo - N - methylmorphinan [III] (3.0 g.) is heated with concentrated hydrochloric acid (60 cc.) and amalgamated zinc (prepared from 20 g. of mossy zinc and 2 g. of mercuric chloride) for 6 hours and yields 2.36 g. of D-3-methoxy-4-phenoxy-N-methyl-$\Delta^6$-morphinan [VII]. The methanol adduct M.P. 91–96° C. is not depressed on admixture with a sample obtained as in Example 7.

*Example 9*

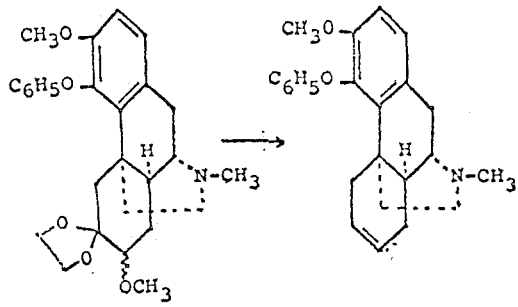

[IV]   [VII]

D - 3,7 - dimethoxy - 4 - phenoxy - 6,6 - ethylenedioxy-N-methylmorphinan [IV] (1.0 g.) is heated with concentrated hydrochloric acid (8 cc.) and amalgamated zinc prepared from 6.5 g. of mossy zinc for 6 hours and yields 0.5 g. of D-3-methoxy-4-phenoxy-N-methyl-$\Delta^6$-morphinan [VII]. The methanol adduct M.P. 91–96° C. is not depressed on admixture with a sample obtained as in Example 7.

*Example 10*

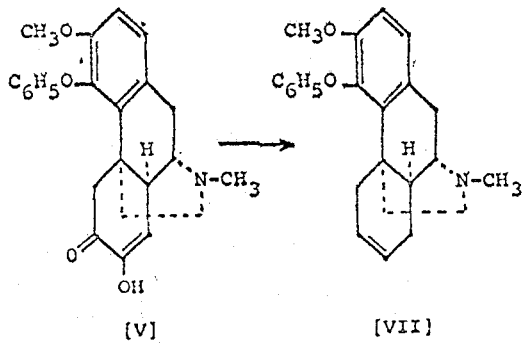

[V]   [VII]

D-3-methoxy-4-phenoxy-6-oxo-7-hydroxy-N-methyl-$\Delta^7$-morphinan [V] (2.0 g.) is heated with concentrated hydrochloric acid (50 cc.) and amalgamated zinc (prepared from 13 g. of mossy zinc and 1 g. of mercuric chloride) for 6 hours and yields 1.62 g. of D-3-methoxy-4-phenoxy-N-methyl-$\Delta^6$-morphinan [VII]. The methanol adduct M.P. 91–96° C. is not depressed on admixture with a sample obtained as in Example 7.

*Example 11*

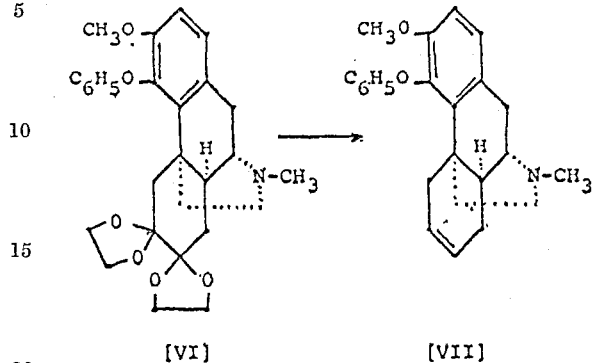

[VI]   [VII]

D-3-methoxy-4-phenoxy-6,6;7,7-bisethylenedioxy-N-methylmorphinan [VI] is heated with amalgamated zinc in concentrated hydrochloric acid in the similar manner as described in the foregoing Examples and yields D-3-methoxy-4-phenoxy-N-methyl-$\Delta^6$-morphinan [VII]. The methanol adduct 91–96° C. is not depressed on admixture with a sample obtained as in Example 7.

*Example 12*

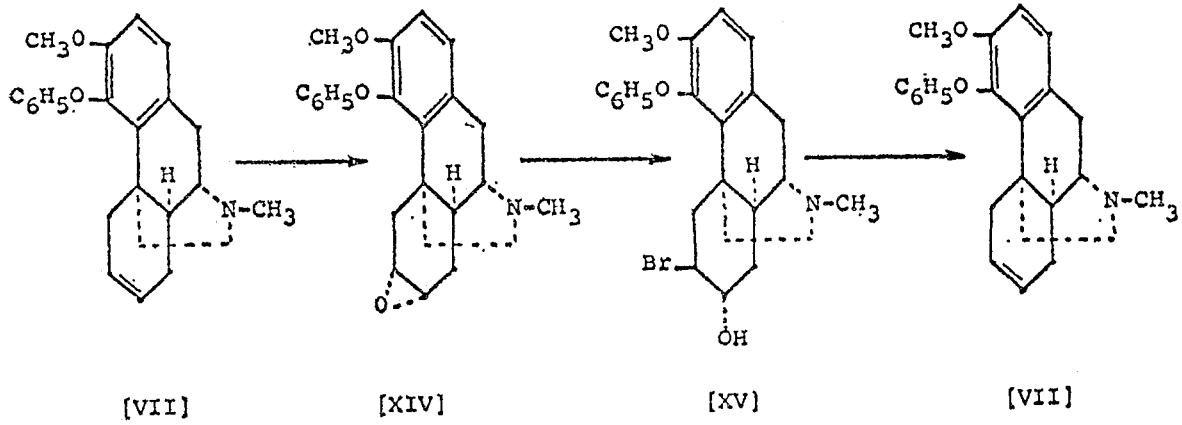

[VII]   [XIV]   [XV]   [VII]

(Purification of the compound [VII])

A solution of crude D-3-methoxy-4-phenoxy-N-methyl-$\Delta^6$-morphinan [VII] (17.50 g.) in chloroform (70 cc.) is allowed to stand with benzoic acid (6.50 g.) and perbenzoic acid (14.71 g.) for 48 hours in a refrigerator. Then the reaction mixture is treated with 2.5% sodium carbonate solution and the chloroform is evaporated. The residue (23.12 g.) (N-oxide of D-3-methoxy-4-phenoxy-6,7-epoxy-N-methylmorphinan) is dissolved in methanol (250 cc.) and hydrogenated over Raney-Ni (19 g.). After absorption of 1180 cc. of hydrogen, the solution is filtered and evaporated. The residue (19.66 g.) is dissolved in benzene (500 cc.), treated with 2.5% sodium carbonate solution, and evaporated. The residue (16.87 g.) (D-3-methoxy-4-phenoxy-6,7-epoxy-N-methylmorphinan [XIV] is dissolved in benzene (40 cc.) with benzoic acid (5.7 g.) by heating. After cooling, precipitated crystals are collected by filtration and recrystallized from acetone to give benzoate of formula [XIV] (10.96 g.) M.P. 174–175° C. The benzoate (10.96 g.) is treated with 2% sodium carbonate solution and extracted with ether. After removal of the ether, the residue is crystallized from ether to give the free base of [XIV] (7.76 g.), M.P. 136–138° C.

$[\alpha]_D^{25}+57.2°$ (1.030% in ethanol).

*Analysis.*—Calcd. for $C_{24}H_{27}O_3N$: C, 76.36; H, 7.21; N, 3.71. Found: C, 76.67; H, 7.34; N, 3.80.

To a solution of D-3-methoxy-4-phenoxy-6,7-epoxy-N-methylmorphinan [XIV] (7.76 g.) in chloroform (300 cc.) is added another solution of hydrogen bromide (6.2 g.) in chloroform (465 g.), keeping the temperature under 0° C., and the mixture is allowed to stand at 0° C. for 40 minutes. After treatment with 5% aqueous sodium bicarbonate solution, the chloroform is removed and the residue is crystallized from ether to give D-3-methoxy-4-phenoxy-6-bromo-7-hydroxy-N-methylmorphinan [XV] (8.68 g.), M.P. 117–118° C.

$[\alpha]_D^{25} + 54.3°$ (0.897% in ethanol).

Analysis.—Calcd. for $C_{24}H_{28}O_3NBr$: C, 62.88; H, 616; N, 3.06; Br, 17.43. Found: C, 62.58; H, 6.28; N, 3.10; Br, 17.28.

The hydrobromide: M.P. 187–188° C. (decomp.).
The hydrochloride: M.P. 186–187° C. (decomp.).

A solution of the bromohydrine [XV] (8.68 g.) in glacial acetic acid (60 cc.) is heated with zinc dust (12.2 g.) on a boiling water bath for 2 hours. After cooling, the mixture is made alkaline by addition of 10% aqueous ammonia and extracted with ether. After removal of the solvent, the residue is crystallized from methanol to give 6.79 g. of pure methanol adduct of D-3-methoxy-4-phenoxy-N-methyl-Δ⁶-morphinan [VII], M.P. 98–99° C. No depression of the melting point is observed on admixture with a pure sample.

*Example 13*

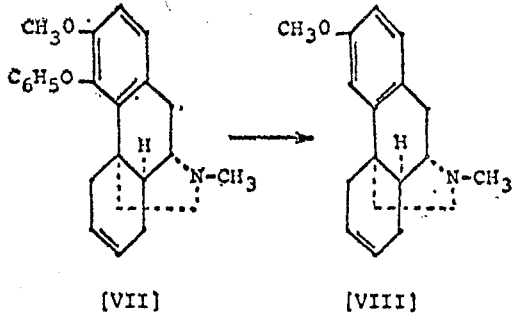

[VII]   [VIII]

A solution of D-3-methoxy-4-phenoxy-N-methyl-Δ⁶-morphinan [VII] (7.47 g.), purified by the method described in Example 12, in dry toluene (70 cc.) is added dropwise to liquid ammonia (300 cc.) (treated previously with a small amount of metallic sodium at −55 to −60° C.). Another 1.3 g. of metallic sodium is added to this stirred solution keeping the temperature at about −55 to −60° C. When a blue coloration has persisted for one hour, a small amount of ammonium chloride is added and the blue color disappears. Liquid ammonia is evaporated and the residue is treated with ether and the ether extracts are washed with diluted sodium hydroxide solution. The ether layer gives 5.4 g. of D-3-methoxy-N-methyl-Δ⁶-morphinan, M.P. 81–82° C. The product is dissolved in ether and chromatographed on alumina to give 5.1 g. of pure D-3-methoxy-N-methyl-Δ⁶-morphinan, M.P. 81–82° C.

$[\alpha]_D^{27} + 138.5°$ (1.103% in ethanol).

The picrate is prepared in and crystallizes from methanol, M.P. 178–179° C.

Analysis.—Calcd. for $C_{18}H_{23}ON \cdot C_6H_3O_7N_3$: C, 57.82; H, 5.26; N, 11.24. Found: C, 57.91; H, 5.37; N, 11.04.

The hydrobromide is crystallized from hot water, M.P. 111–113° C. (decomp.).

$[\alpha]_D^{30} + 82.6°$ (1.062% in water).

Analysis.—Calcd. for $C_{18}H_{23}ON \cdot HBr \cdot H_2O$: C, 58.69; H, 7.12; N, 3.80; Br, 21.70. Found: C, 58.39; H, 7.24; N, 4.05; Br, 21.26.

The methiodide is prepared in ethanol and crystallizes from ethanol-ether, M.P. 230° C. (decomp.).

$[\alpha]_D^{29} + 79.8°$ (0.747% in methanol).

Analysis.—Calcd. for $C_{18}H_{23}ON \cdot CH_3I$: C, 55.48; H, 6.37; N, 3.41. Found: C, 55.31; H, 6.54; N, 3.09.

*Example 14*

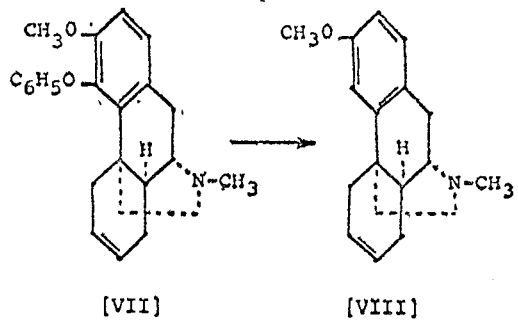

[VII]   [VIII]

A solution of D-3-methoxy-4-phenoxy-N-methyl-Δ⁶-morphinan (VII) (0.98 g.), not purified, in dry ether (60 cc.) is added dropwise to liquid ammonia (150 cc.) (treated previously with a small amount of metallic sodium at −55 to −60° C.). Another 0.3 g. of metallic sodium is added to this stirred solution keeping the temperature at about −55 to −60° C. When a blue coloration persists for one hour, a small amount of ammonium chloride is added and color disappears. Working up in the similar manner to Example 13, D-3-methoxy-N-methyl-Δ⁶-morphinan (VIII) (0.68 g.) is obtained, M.P. 78–85° C.

Analysis.—Calcd. for $C_{18}H_{23}ON$: C, 80.25; H, 8.61; N, 5.20. Found: C, 80.03; H, 8.95; N, 4.98.

The melting point of this product is not depressed on admixture with a sample obtained as in Example 13.

The utilities hereinbefore enumerated for D-3-methoxy-Δ⁶-morphinan are also applicable to the herein-disclosed quaternary and acid-addition salts thereof.

Suitable oral dosages for realizing such utilities range from about 5 milligrams to about 20 milligrams per day.

Having thus disclosed the invention, what is claimed is:

1. D-3-methoxy-4-phenoxy-N-methyl-Δ⁶-morphinan.
2. Methanol adduct of D-3 - methoxy - 4 - phenoxy-N-methyl-Δ⁶-morphinan.
3. Methiodide of D-3-methoxy-4-phenoxy-N-methyl-Δ⁶-morphinan.
4. Picrate of D - 3 - methoxy-4-phenoxy-N-methyl-Δ⁶-morphinan.
5. D - 3 - methoxy - 4 - phenoxy - 6,7 - epoxy - N-methyl-morphinan N-oxide.
6. D - 3 - methoxy - 4 - phenoxy - 6,7 - epoxy - N-methyl-morphian.
7. Hydrohalide of D-3-methoxy-4-phenoxy-6,7-epoxy-N-methylmorphinan.
8. D - 3 - methoxy - 4 - phenoxy - 6 - bromo - 7 - hydroxy-N-methylmorphinan.
9. Hydrohalide of D-3-methoxy-4-phenoxy-6-bromo-7-hydroxy-N-methylmorphinan.
10. A method for the purification of D-3-methoxy-4-phenoxy-N-methyl-Δ⁶-morphinan which comprises oxidizing the compound with per-acid at about 0° C. to obtain D-3-methoxy-4-phenoxy - 6,7 - epoxy - N - methylmorphinan N-oxide, reducing the N-oxide by catalytic reduction to obtain D-3-methoxy-4-phenoxy-6,7-epoxy-N-methylmorphinan, crystallizing the 6,7-epoxide as benzoate, treating the benzoate with alkali to isolate the free base of the 6,7-epoxide, converting the 6,7-epoxide to D-3-methoxy-4-phenoxy-6-bromo-7-hydroxy - N - methylmorphinan by treatment with hydrogen bromide at about 0° C. and then treating the bromohydrine with metallic zinc in acetic acid at about 100° C. to regenerate D-3-methoxy-4-phenoxy-N-methyl-Δ⁶-morphinan.

No references cited.